United States Patent

Leng et al.

[11] 3,884,899
[45] May 20, 1975

[54] WATER SOLUBLE QUATERNIZED BENZTHIAZOLE PHENYLAZOPYRIDINE DYESTUFFS

[75] Inventors: John Lindley Leng; David Frederick Newton, both of Manchester, England

[73] Assignee: Imperial Chemical Industries Limited, London, England

[22] Filed: Apr. 9, 1973

[21] Appl. No.: 349,191

[30] Foreign Application Priority Data
Apr. 17, 1972 United Kingdom............... 17583/72

[52] U.S. Cl.............. 260/146 R; 260/155; 260/156
[51] Int. Cl............................................. C09c 29/36
[58] Field of Search.................... 260/155, 156, 146

[56] References Cited
UNITED STATES PATENTS

| | | | |
|---|---|---|---|
| 2,857,372 | 10/1958 | Straley et al. | 260/156 |
| 2,872,440 | 2/1959 | Davies | 260/155 |
| 2,893,816 | 7/1959 | Tsang et al. | 260/156 |
| 3,086,002 | 4/1963 | Baumann et al. | 260/155 |
| 3,132,132 | 5/1964 | Suzuki et al. | 260/158 |
| 3,133,052 | 5/1964 | Merion et al. | 260/155 |
| 3,487,066 | 12/1969 | Ritter et al. | 260/156 |
| 3,585,182 | 6/1971 | Straley et al. | 260/155 |
| 3,657,214 | 4/1972 | Berrie et al. | 260/156 |
| 3,664,996 | 5/1972 | Berrie et al. | 260/156 |

Primary Examiner—Henry R. Jiles
Assistant Examiner—Robert W. Ramsuer
Attorney, Agent, or Firm—Cushman, Darby & Cushman

[57] ABSTRACT

Azo dyestuffs devoid of carboxylic acid or sulphonic acid groups and of the formula (I)

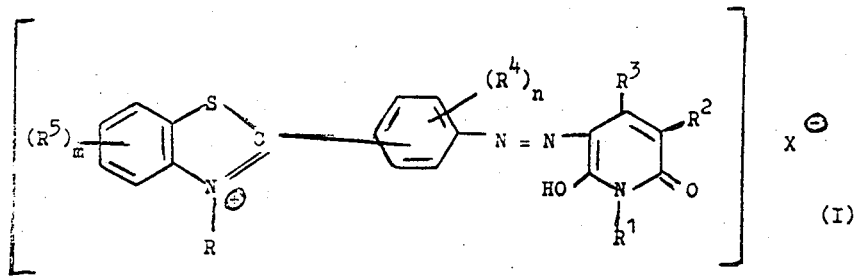

wherein R represents an optionally substituted alkyl or aralkyl radical, $R^1$ represents hydrogen, an amino or substituted amino radical, or an optionally substituted alkyl, aralkyl, cycloalkyl or aryl radical, $R^2$ may represent hydrogen, an optionally substituted alkyl, aralkyl, cycloaalkyl or aryl radical, a cyano radical, a nitro radical, halogen, an amino or substituted amino radical or a radical of the formula $COR^6$, $COOR^6$, $CONR^6R^7$ or $SO_2NR^6R^7$ wherein $R^6$ and $R^7$ independently represent hydrogen or optionally substituted alkyl, aralkyl, cycloalkyl, aryl or heterocyclic radicals or taken together with the N atom form a 5 or 6 membered ring, $R^3$ may represent hydrogen or an optionally substituted alkyl, aralkyl, cycloalkyl, aryl or heterocyclic radical or a hydroxy, cyano, —$COR^6$, $COOR^6$ or $CONR^6R^7$ radical or $R^2$ and $R^3$ taken together may represent a 5, 6 or 7 membered ring either saturated or unsaturated fused to the pyridone ring, $R^4$ and $R^5$ represent non-ionogenic substituents, X represents an anion and m and n are integers from 1 to 3.

The dyestuffs are useful for the colouration of polymeric materials especially polyacrylonitrile and blends thereof. The dyestuffs give valuable shades of high tinctorial strength and possess rapid dyeing characteristics. Dyeings of good fastness proportions to washing and light are obtained with the dyestuffs of this invention.

3 Claims, No Drawings

WATER SOLUBLE QUATERNIZED BENZTHIAZOLE PHENYLAZOPYRIDINE DYESTUFFS

This invention relates to azo dyestuffs which are valuable for the colouration of polymeric textile materials in the form of fibres, films, threads, tapes or woven materials and particularly polymeric textile materials comprising polymers and copolymers of acrylonitrile or dicyanoethylene, and acid-modified polyesters and polyamides.

According to the present invention there are provided azo dyestuffs devoid of carboxylic acid or sulphonic acid groups and of the formula (I)

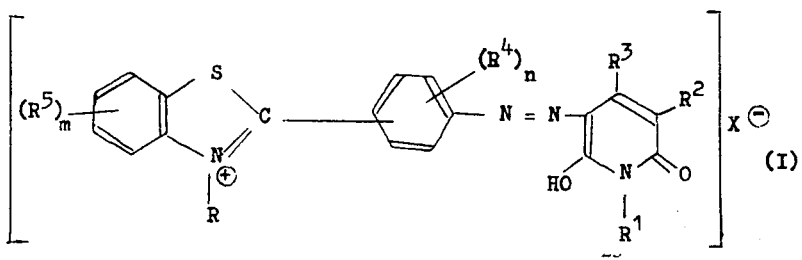

wherein R represents an optionally substituted alkyl or aralkyl radical, $R^1$ represents hydrogen, an amino or substituted amino radical, or an optionally substituted alkyl, aralkyl, cycloalkyl or aryl radical, $R^2$ may represent hydrogen, an optionally substituted alkyl, aralkyl, cycloalkyl or aryl radical, a cyano radical, a nitro radical, halogen, an amino or substituted amino radical or a radical of the formula $COR^6$, $COOR^6$, $CONR^6R^7$ or $SO_2NR^6R^7$ wherein $R^6$ and $R^7$ independently represent hydrogen or optionally substituted alkyl, aralkyl, cycloalkyl, aryl or heterocyclic radicals or taken together with the N atom form a 5 or 6 membered ring, $R^3$ may represent hydrogen or an optionally substituted alkyl, aralkyl, cycloalkyl, aryl or heterocyclic radical or a hydroxy, cyano, $-COR^6$, $COOR^6$ or $CONR^6R^7$ radical or $R^2$ and $R^3$ taken together may represent a 5, 6 or 7 membered ring either saturated or unsaturated fused to the pyridone ring, $R^4$ and $R^5$ represent non-ionogenic substituents, X represents an anion and m and n are integers from 1 to 3.

The dyestuffs of the invention exist in a number of possible tautomeric forms. For convenience they have been formulated in one of these forms but it is to be understood that the invention relates to the dyestuff in any of the possible tautomeric forms.

Examples of R include methyl, ethyl, β-carbamidoethyl, β-hydroxyethyl, benzyl, 4'-methylbenzyl and α-chloro-β-hydroxypropyl.

Examples of $R^1$ include hydrogen, amino, methyl, n-propyl, ethyl, β-hydroxy ethyl, γ-methoxypropyl, isopropyl, phenyl, tolyl, anisyl, β-aminoethyl, n-butyl, isobutyl, lauryl, benzyl, methoxyphenyl, nitrophenyl such as o-nitrophenyl and p-nitrophenyl, p-aminophenyl, cyclohexyl chlorophenyl such as, o-, m- and p-chlorophenyl and 2',5'-dichlorophenyl and α-naphthyl.

Examples of $R^2$ include hydrogen, cyano, $-CONH_2$, carbondiethylamide, carbethoxy, methyl, n-butyl, ethyl, nitro, carbamoyl amino, acylamino such as acetylamino, benzoylamino and chloro.

Examples of $R^3$ include hydrogen, methyl, ethyl, phenyl, carbamoyl, carboethoxy, acetoxy, acetamido, diethylacetamido, cyano, p-hydroxy phenyl, p-methoxy phenyl and hydroxy.

Examples of $R^2$ and $R^3$ taken together which result in the formation of a 5,6- or 7 membered ring include trimethylene, tetramethylene, pentamethylene and the group -CH=CH-CH=CH - which forms the isoquinoline nucleus with the pyridone ring.

Examples of $R^4$ include hydrogen, methyl, chloro, methoxy and ethoxy.

Examples of $R^5$ include methyl, chloro, methoxy and ethoxy.

Examples of $R^6$ and $R^7$ include hydrogen, methyl and ethyl.

Examples of the anion X include chloride, bromide, iodide, tetrachlorozincate, bisulphate, nitrate, sulphate, sulphamate, phosphate or borate or organic anions such as acetate, propionate, methylsulphate and p-tolylsulphonate. In those cases where the anion is polyvalent the dyestuffs will contain a corresponding molar proportion of the cationic part of the dyestuff.

A preferred class of dyestuffs of the invention are those of the formula:

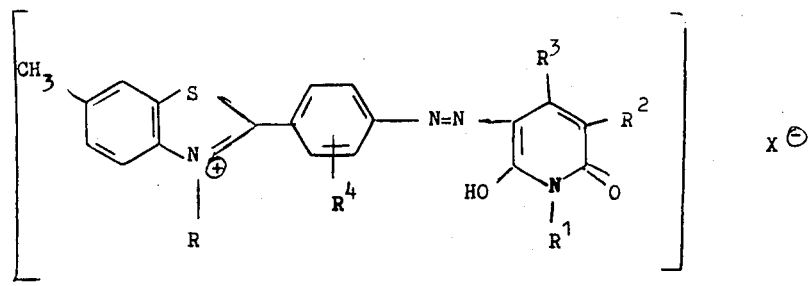

wherein R, R⁴ and X are as hereinbefore defined, R¹ is an optionally substituted alkyl, aryl or aralkyl radical, R² is hydrogen, cyano, or an optionally substituted alkyl radical and R³ is hydrogen or an optionally substituted alkyl or aryl radical.

In a further embodiment of the present invention there is provided a process for manufacture of the soluble azo dyestuffs of the invention by reacting insoluble azo dyestuffs of the general formula:

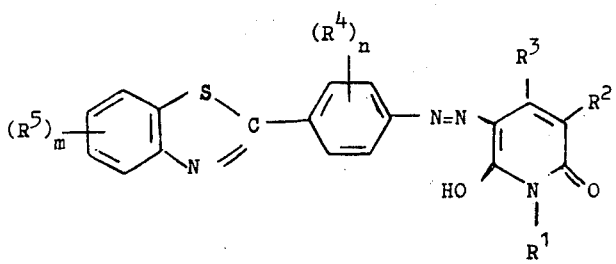

with an alkylating agent.

As examples of alkylating agents there may be mentioned dialkyl sulphates such as diethyl sulphate and dimethyl sulphate, alkyl toluene sulphonates such as methyl p-toluene sulphonate, halides such as methyl bromide, ethyl bromide, methyl iodide, ethyl iodide, benzyl chloride or bromide, β-bromopropionamide.

The alkylating reaction may be effected in an inert organic solvent such as benzene, toluene, xylene, chlorobenzene, nitrobenzene, acetone, carbon tetrachloride, tetrachloroethane or β-ethoxyethanol, but in certain cases it is possible and even preferable to use a medium consisting of the alkylating agent or of water or a water-miscible organic solvent such as acetic acid. The alkylating agent may be used in considerable excess, for example up to 6 moles for each mol. of dyestuff. Suitable temperatures are from 20° to 150°C.

When the reaction is effected in hydrophobic organic solvents the alkylated dyestuff is normally insoluble and may be isolated by filtration. If desired the alkylated dyestuffs may be isolated from aqueous solution by precipitation in the form of a salt such as tetrachlorozincate obtained by adding zinc chloride to the aqueous solution.

Insoluble azo dyestuffs which may be used as starting materials in the alkylation process may be made by diazotising a 2-(aminophenyl)-benzthiazole of the general formula

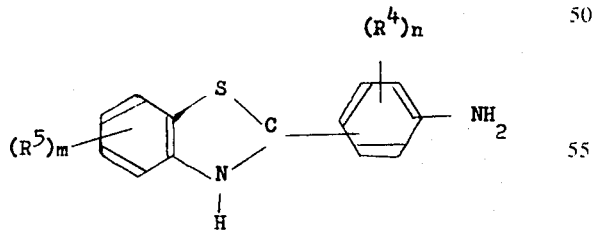

and coupling the resultant diazo compound with a compound of the formula

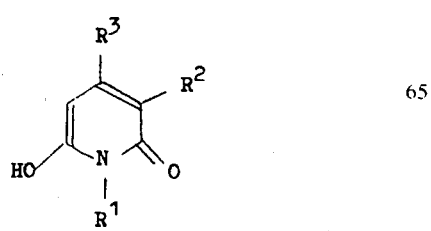

wherein R¹, R², R³, R⁴, R⁵ and n are as hereinbefore stated.

2-(Aminophenyl)benzthiazoles which may be used as diazo components include
2-(4'-aminophenyl)-6-methylbenzthiazole
2-(4'-amino-3'-methylphenyl)-4,6-dimethylbenzthiazole
2-(2'-aminophenyl)-4-methylbenzthiazole
2-(4'-aminophenyl)benzthiazole (II)

2-(4'-aminophenyl)-6-chlorobenzthiazole
2-(4'-amino-3'-chlorophenyl)-6-methylbenzthiazole
2-(4'-amino-3'-methoxyphenyl)-6-ethoxybenzthiazole
2-(2'-aminophenyl)-6-methylbenzthiasole
2-(3'-aminophenyl)-6-methylbenzthiazole
2-(4'-amino-3',5'-dichlorophenyl)-6-methylbenzthiazole
2-(4'-amino-3'-phenylmercapto)-6-methylbenzthiazole
2-(2'-aminophenyl)-5-methylbenzthiazole and
2-(3'-aminophenyl)-5-methylbenzthiazole As coupling components of the formula

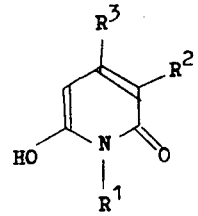

there may be used for example:
1-amino-4-methyl-3cyano-6-hydroxy-pyrid-2-one
1-methyl-3-cyano-4-methyl-6-hydroxypyrid-2-one
1-ethyl-3-cyano-4-methyl-6-hydroxypyrid-2-one
1-β-hydroxyethyl-4-methyl-6-hydroxypyrid-2-one
1-γ-methoxypropyl-4-methyl-6-hydroxypyrid-2-one
1-phenyl-3-cyano-4-methyl-6-hydroxypyrid-2-one
1-p-tolyl-3-cyano-4-methyl-6-hydroxypyrid-2-one
1-p-anisyl-3-cyano-4-methyl-6-hydroxypyrid-2-one
1-phenyl-3-cyano-4-phenyl-6-hydroxypyrid-2-one
1-p-tolyl-3-cyano-4-phenyl-6-hydroxypyrid-2-one
1-p-anisyl-3-cyano-4-phenyl-6-hydroxypyrid-2-one
1-phenyl-3-carbonamido-4-methyl-6-hydroxypyrid-2-one
1-phenyl-3-carbonamido-4-methyl-6-hydroxypyrid-2-one
1-phenyl-3-carbonamido-4-phenyl-6-hydroxypyrid-2-one
1-phenyl-3-carbethoxy-4-methyl-6-hydroxypyrid-2-one
1-phenyl-3-carbethoxy-4-phenyl-6-hydroxypyrid-2-one
2:6-dihydroxy-3-carbonamido-4-methyl pyridine
2:6-dihydroxy-3-carbethoxy-4-methylpyridine
2:6-dihydroxy-3-carbondiethylamide-4-methyl pyridine
2:6-dihydroxy-3-carbonamide pyridine 2:6-dihydroxy-3-carbonamide-4-phenyl pyridine
2:6-dihydroxy-3-carbethoxy-4-phenyl pyridine
2:6-dihydroxy-3-cyano-4-carboethoxy pyridine
2:6-dihydroxy-3-cyano-4-carbamoyl pyridine ethyl
2:6-dihydroxy-3-cyano-pyrid-4-ylacetate,
2:6-dihydroxy-3-cyano-pyrid-4-yl acetamide,
2:6-dihydroxy-3-cyanopyrid-4-yl acetdiethyl amide
2:6-dihydroxy-3:4-di(carboethoxy)pyridine
2:6-dihydroxy-3-carbamoyl-4-carbethoxy pyridine
2:6-dihydroxy-3:4-di(carbamoyl) pyridine
2:6-dihydroxypyridine
2:6-dihydroxy-4-methylpyridine
ethyl 2:6-dihydroxy iso-nicotinate
2:6-dihydroxy iso-nicotinamide
2:6-dihydroxy iso-nicotinic acid diethylamide
2:6-dihydroxy-4-cyanopyridine
2:6-dihydroxy-4-phenylpyridine
2:6-dihydroxy-4-(p-hydroxyphenyl)pyridine
2:6-dihydroxy-4-(p-methoxyphenyl)pyridine
3-cyano-4-methyl-2,6-dihydroxypyridine
4-methyl-2,6-dihydroxy pyridine
2,4,6-trihydroxy pyridine
3-cyano-2,4,6-trihydroxy pyridine
1-ethyl-3,4-dimethyl-6-hydroxypyrid-2-one
1-β-hydroxyethyl-3-n-butyl-4-methyl-6-hydroxypyrid-2-one
1-β-aminoethyl-3,4-diethyl-6-hydroxypyrid-2-one
1-ethyl-3,4-trimethylene-6-hydroxypyrid-2-one
1-methyl-5-carbonamino-3,4-tetramethylene-6-hydroxypyrid-2-one
1-n-propyl-3,4-pentamethylene-6-hydroxypyrid-2-one
1-iso-butyl-4-methyl-3-nitro-6-hydroxypyrid-2-one
1-lauryl-4-methyl-3-nitro-6-hydroxypyrid-2-one
4-carboxy-3-nitro-2,6-dihydroxypyridine
4-aminocarbonyl-3-nitro-2,6-dihydroxypyridine
4-ethoxycarbonyl-3-nitro-2,6-dihydroxypyridine
1-ethyl-4-methyl-3-nitro-6-hydroxypyrid-2-one
1,4-dimethyl-3-nitro-6-hydroxypyrid-2-one
1-ethyl-4-phenyl-3-nitro-6-hydroxypyrid-2-one
1-phenyl-4-methyl-3-nitro-6-hydroxypyrid-2-one
1-benzyl-4-methyl-3-nitro-6-hydroxypyrid-2-one
1-(4'-nitrophenyl)-4-methyl-3-nitro-6-hydroxypyrid-2-one
1-(4'-aminophenyl)-4-methyl-3-nitro-6-hydroxypyrid-2-one
1-cyclohexyl-4-methyl-3-nitro-6-hydroxypyrid-2-one
4-methyl-3-nitro-2,6-dihydroxypyridine
1-n-propyl-4-methyl-3-nitro-6-hydroxypyrid-2-one
1-isopropyl-4-methyl-3-nitro-6-hydroxypyrid-2-one
1-(3'-chlorophenyl)-4-ethyl-3-nitro-6-hydroxypyrid-2-one
1-(4'-methylphenyl)-4-phenyl-3-nitro-6-hydroxypyrid-2-one
1-(3',5'-dichlorophenyl)-4-methyl-nitro-6-hydroxypyrid-2-one
1-α'-naphthyl-4-(4'-methoxyphenyl)-3-nitro-6-hydroxypyrid-2-one
1-(4'-methoxyphenyl)-4-phenyl-3-nitro-6-hydroxypyrid-2-one
1-γ-methoxypropyl-4-methyl-3-nitro-6-hydroxypyrid-2-one
1-methyl-4-phenyl-3-nitro-6-hydroxypyrid-2-one
1-n-butyl-4-methyl-3-nitro-6-hydroxypyrid-2-one
3-amino-1-ethyl-4-methyl-6-hydroxypyrid-2-one
1-ethyl-4-methyl-3-acetylamino-6-hydroxypyrid-2-one
1,4-dimethyl-3-acetylamino-6-hydroxypyrid-2-one
1-ethyl-4-phenyl-3-acetylamino-6-hydroxypyrid-2-one
1-phenyl-4-methyl-3-acetylamino-6-hydroxypyrid-2-one
1-benzyl-4-methyl-3-benzoylamino-6-hydroxypyrid-2-one
4-methyl-3-(4'-methylphenylsulphonyl)amino-2,6-dihydroxypyridine
1-ethyl-4-methyl-3-chloro-6-hydroxypyrid-2-one
1-phenyl-4-methyl-3-chloro-6-hydroxypyrid-2-one
1-(4'-methylphenyl)-4-ethyl-3-chloro-6-hydroxypyrid-2-one and
1-(2'-chlorophenyl)-4-phenyl-3-chloro-6-hydroxypyrid-2-one Coupling agents wherein $R^2$ and $R^3$ taken together form a cyclic ring fused to the pyridone ring include isoquinoline-1,3-diols or homophthalimides, for example 2-ethylisoquinoline-1,3-diol
isoquinoline-1,3-diol
2-γ-dimethylaminopropylisoquinoline-1,3-diol hydrochloride
2-β-hydroxyethylisoquinoline-1,3-diol
2-β-acetylaminoethylisoquinoline-1,3-diol
2-phenyl isoquinoline-1,3-diol
2-4'-methylphenylisoquinoline-1,3-diol
2-aminoisoquinoline-1,3-diol
2-phenylaminoisoquinoline-1,3-diol
2-3'-chlorophenylisoquinoline-1,3-diol
1-o-chlorophenyl-3-cyano-4-methyl-6-hydroxypyrid-2-one
1-p-chlorophenyl-3-cyano-4-methyl-6-hydroxypyrid-2-one
1-m-anisyl-3-cyano-4-methyl-6-hydroxypyrid-2-one
1-β-aminoethyl-3-cyano-4-methyl-6-hydroxypyrid-2-one
1-ethyl-4-methyl-6-hydroxypyrid-2-one
1-propyl-4-methyl-6-hydroxypyrid-2-one
1-n-butyl-4-methyl-6-hydroxypyrid-2-one
1-phenyl-4-methyl-6-hydroxypyrid-2-one
1-2'-chlorophenyl-4-methyl-6-hydroxypyrid-2-one
1-2'-methylphenyl-4-methyl-6-hydroxypyrid-2-one
1-4'-methylphenyl-4-methyl-6-hydroxypyrid-2-one and
1-β-aminoethyl-4-methyl-6-hydroxypyrid-2-one In an alternative method of preparation, dyestuffs of the invention wherein R represents a group of the formula —CH(X)—CH$_2$—CONH$_2$ where X is lower alkyl or hydrogen, for example the carbonamidoethyl may be made by reacting an insoluble azo dyestuff of formula II with a compound of the formula CH(X)=CH—CONH$_2$ in the presence of acid, for example organic or mineral acid or a mixture thereof. The method is described in U.S. Pat. No. 3,132,132. Compounds of the above formula include acrylamide, and methacrylamide. By the term lower alkyl we mean having from one to four carbon atoms.

The dyestuffs of the present invention may be applied to polymeric textile materials from an aqueous bath. The present dyestuffs give valuable bright shades of high tinctorial strength and possess rapid dyeing characteristics.

In particular the dyestuffs of the invention are valuable for dyeing polyacrylonitrile materials and may be applied to polyacrylonitrile materials from acid, neutral or slightly alkaline dyebaths (i.e., pH from 3–8) at temperatures between 40°–120°C and preferably between 80°–120°C or by printing techniques using thickened print pastes. Dyeings of good fastness properties to washing and light are obtained.

The invention is illustrated, but not limited by the following Examples in which all parts and percentages are be weight unless otherwise stated.

EXAMPLE 1

4.2 Parts of a dyestuff of formula:

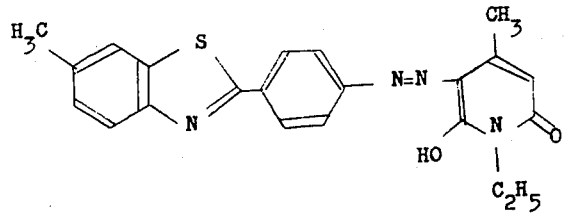

are suspended in 78 parts of monochlorobenzene at 110°C, and 3.4 parts of dimethyl sulphate are added. The mixture is heated at 100°–110°C for 18 hours, and the precipitated dyestuff filtered off. This is purified by redissolving in 200 parts of hot water, filtereng hot and salting the filtrate.

When applied to polyacrylonitrile fibre from a neutral or weakly acidic dyebath, the dyestuff produces very bright greenish-yellow shade with good fastness properties.

EXAMPLE 2

4.3 Parts of a dyestuff of formula:

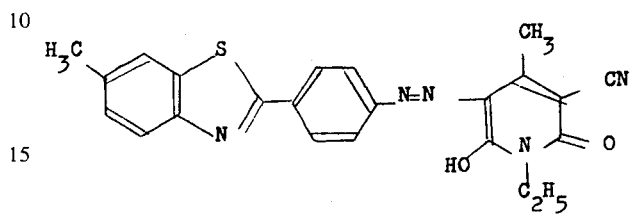

are reacted with dimethyl sulphate in a similar manner to that described in Example 1.

The dyestuff produced, when applied to polyacrylonitrile fibre from neutral or weakly acidic dyebaths, yields a greenish-yellow shade, (somewhat redder than that obtained from the dyestuff described in Example 1) with good fastness properties.

The following similar dyestuffs are obtained in a similar manner to that outlined in Example 1 using the reactants shown.

| Example | Water-insoluble dye | Alkylating Agent | Shade on polyacrylonitrile |
|---|---|---|---|
| 3 | ![structure] | dimethyl sulphate | greenish-yellow |
| 4 | ![structure] | dimethyl sulphate | " " |
| 5 | ![structure] | diethyl sulphate | " " |

| Example | Water-insoluble dye | Alkylating Agent | Shade on polyacrylonitrile |
|---|---|---|---|
| 6 | 2-(4'-aminophenyl)-6-methylbenzthiazole coupled with 1-β-hydroxyethyl-4-methyl-3-cyano-6-hydroxypyrid-2-one (structure shown) | diethyl sulphate | greenish-yellow |
| 7 | 2-(4'-aminophenyl)-6-methylbenzthiazole coupled with 1-ethyl-3,4-dimethyl-6-hydroxypyrid-2-one (structure shown) | dimethyl sulphate | " " |
| 8 | 2-(4'-aminophenyl)-6-methylbenzthiazole coupled with 1-ethyl-4-hydroxy-isoquinolin-2-one type coupler (structure shown) | dimethyl sulphate | " " |

EXAMPLES 9 – 64

Similar dyestuffs can be made by the same procedure using the starting materials listed in the following table. The table also gives the shade obtained when the dyestuffs are applied to polyacrylonitrile.

| Example | Diazo Component | Coupling Component | Alkylating Agent | Shade on Polyacrylonitrile |
|---|---|---|---|---|
| 9 | 2-(4'-aminophenyl)-6-methylbenzthiazole | 1-β-aminoethyl-4-methyl-3-cyano-6-hydroxypyrid-2-one | Dimethyl sulphate | Greenish-yellow |
| 10 | " | 1-n-butyl-4-methyl-3-cyano-6-hydroxypyrid-2-one | " | " |
| 11 | " | 1-n-propyl-4-methyl-3-cyano-6-hydroxypyrid-2-one | " | " |
| 12 | " | 1-phenyl-4-methyl-3-cyano-6-hydroxypyrid-2-one | " | " |
| 13 | " | 1-2'-chlorophenyl-4-methyl-3-cyano-6-hydroxypyrid-2-one | " | " |
| 14 | " | 1-4'-chlorophenyl-4-methyl-3-cyano-6-hydroxypyrid-2-one | " | " |
| 15 | " | 1-4'-methylphenyl-4-methyl-3-cyano-6-hydroxypyrid-2-one | " | " |
| 16 | " | 1-4'-methoxyphenyl-4-methyl-3-cyano-6-hydroxypyrid-2-one | " | " |
| 17 | " | 1-2'-methylphenyl-4-methyl-3-cyano-6-hydroxypyrid-2-one | " | " |
| 18 | " | 1-amino-4-methyl-3-cyano-6-hydroxypyrid-2-one | " | " |
| 19 | " | 1-2'-ethylhexyl-4-methyl-3-cyano-6-hydroxypyrid-2-one | " | " |
| 20 | " | 1-benzyl-4-methyl-3-cyano-6-hydroxypyrid-2-one | " | " |
| 21 | " | 1-4'-nitrophenyl-4-methyl-3-cyano-6-hydroxypyrid-2-one | " | " |
| 22 | " | 1-α-naphthyl-4-methyl-3-cyano-6-hydroxypyrid-2-one | " | " |
| 23 | " | 1-phenyl-4-methyl-3-cyano-6-hydroxypyrid-2-one | Diethyl sulphate | " |
| 24 | 2-(4'-amino-3'-methylphenyl)-6-methylbenzthiazole | 1-n-butyl-4-methyl-3-cyano-6-hydroxypyrid-2-one | " | " |
| 25 | " | 1-ethyl-4-methyl-3-cyano-6-hydroxypyrid-2-one | Dimethyl sulphate | " |
| 26 | 2-(4'-aminophenyl)benzthiazole | " | " | " |
| 27 | 2-(4'-aminophenyl)-6-chlorobenzthiazole | " | " | " |
| 28 | 2-(4'-aminophenyl)-4-methylbenzthiazole | " | " | " |
| 29 | 2-(4'-amino-3'-chlorophenyl)-6-methylbenzthiazole | " | " | " |

—Continued

| Example | Diazo Component | Coupling Component | Alkylating Agent | Shade on Polyacrylonitrile |
|---|---|---|---|---|
| 30 | 2-(4'-amino-3'-methoxy-phenyl)-6-ethoxybenzthiazole | 1-ethyl-3-cyano-4-methyl-6-hydroxypyrid-2-one | " | " |
| 31 | 2-(4'-aminophenyl)-6-methylbenzthiazole | 1-n-propyl-4-methyl-6-hydroxypyrid-2-one | " | " |
| 32 | " | 1-n-butyl-4-methyl-6-hydroxypyrid-2-one | " | " |
| 33 | " | 1-phenyl-4-methyl-6-hydroxypyrid-2-one | " | " |
| 34 | 41 | 1-2'-chlorophenyl-4-methyl-6-hydroxypyrid-2-one | " | " |
| 35 | " | 1-4'-chlorophenyl-4-methyl-6-hydroxypyrid-2-one | " | " |
| 36 | " | 1-2'-methylphenyl-4-methyl-6-hydroxypyrid-2-one | " | " |
| 37 | " | 1-β-aminoethyl-4-methyl-6-hydroxypyrid-2-one | " | " |
| 38 | " | 1-methyl-3-chloro-4-methyl-6-hydroxypyrid-2-one | " | " |
| 39 | " | 1-ethyl-3-nitro-4-methyl-6-hydroxypyrid-2-one | " | Yellow |
| 40 | " | 1-methyl-3-carbonamido-4-methyl-6-hydroxypyrid-2-one | " | Greenish-yellow |
| 41 | " | 1-methyl-3-butyl-4-methyl-6-hydroxypyrid-2-one | " | " |
| 42 | " | 1-ethyl-3-butyl-4-methyl-6-hydroxypyrid-2-one | Methyl p-toluene sulphonate | " |
| 43 | " | 1-ethyl-3,4-trimethylene-6-hydroxypyrid-2-one | Diethyl sulphate | " |
| 44 | " | 1-methyl-3,4-tetramethylene-5-carbonamido-6-hydroxypyrid-2-one | " | " |
| 45 | " | 1-n-propyl-3,4-pentamethylene-6-hydroxypyrid-2-one | Dimethyl sulphate | " |
| 46 | " | Isoquinoline-1,3-diol | " | " |
| 47 | " | 2-ethylisoquinoline-1,3-diol | " | " |
| 48 | " | 2-β-hydroxyethylisoquinoline-1,3-diol | " | " |
| 49 | " | 2-phenylisoquinoline-1,3-diol | " | " |
| 50 | " | 1-ethyl-3-acetylamino-4-methyl-6-hydroxypyrid-2-one | " | " |
| 51 | " | 1-ethyl-3-amino-4-methyl-6-hydroxypyrid-2-one | " | Yellow |
| 52 | 2-(2'-aminophenyl)-5-methylbenzthiazole | 1-ethyl-3-cyano-4-methyl-6-hydroxypyrid-2-one | " | Greenish-yellow |
| 53 | 2-(2'-aminophenyl)-6-methylbenzthiazole | " | " | " |
| 54 | 2-(2'-aminophenyl)-4-methylbenzthiazole | " | " | " |
| 55 | 2-(4'-amino-3'-methyl-phenyl)-4,6-dimethyl benzthiazole | " | " | " |
| 56 | 2-(4'-aminophenyl)-6-methylbenzthiazole | 1-phenyl-3-carbethoxy-4-methyl-6-hydroxypyrid-2-one | " | " |
| 57 | " | 1-phenyl-3-carbethoxy-4-phenyl-6-hydroxypyrid-2-one | " | " |
| 58 | " | 1-phenyl-3-carbonamido-4-phenyl-6-hydroxypyrid-2-one | " | " |
| 59 | " | 1-phenyl-3-cyano-4-phenyl-6-hydroxypyrid-2-one | " | " |
| 60 | " | 2,6-dihydroxy-3-carbonamido-4-methylpyridine | " | " |
| 61 | " | 2,6-dihydroxy-3-cyano-4-methylpyridine | " | " |
| 62 | " | 2,6-dihydroxy-3-carbethoxy-4-methylpyridine | " | " |
| 63 | " | 2,6-dihydroxy-4-methylpyridine | " | " |
| 64 | " | 2,6-dihydroxy-iso-nicotinamide | " | " |

EXAMPLE 65

4 parts of a dyestuff of formula:

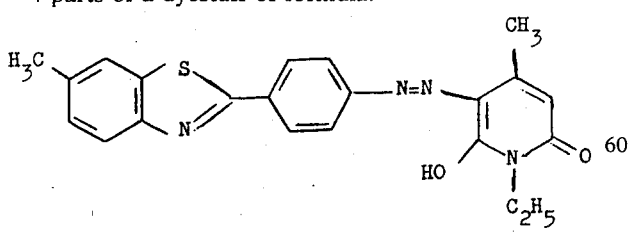

is dissolved in 36 parts of acetic acid, and 7.1 parts of acrylamide added. 1.2 parts of 30 percent hydrochloric acid are added and the mixture stirred and heated at 90° for 18 hours, and poured into 400 parts of water. The mixture is filtered and the residue extracted with 400 parts of boiling water. The combined filtrate and aqueous extract is treated with sodium chloride and zinc chloride, and the precipitated dyestuff separated, washed with a little 10% brine and dried.

When dyed on to polyacrylonitrile fibre from neutral or weakly acidic dyebaths, a bright greenish-yellow shade with good light fastness is obtained.

What we claim is:

1. Water-soluble azo dyestuff devoid of carboxylic acid or sulphonic acid groups of the formula

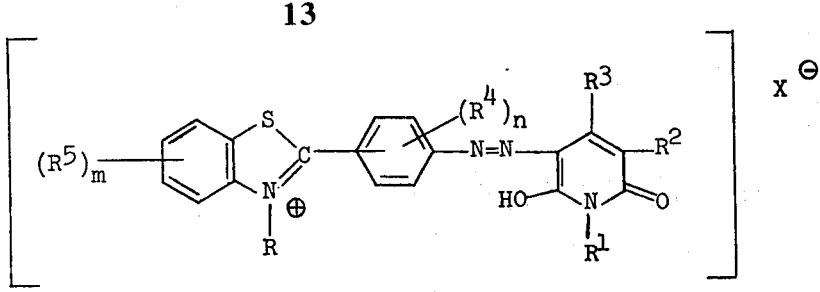

wherein
R represents methyl, ethyl, benzyl or carbonamido-ethyl,
R¹ represents hydrogen, amino, methyl, ethyl, propyl, butyl, hydroxyethyl, aminoethyl, benzyl, naphthyl, phenyl, chlorophenyl, tolyl, nitrophenyl or methoxy phenyl,
R² represents hydrogen, cyano, methyl, chloro, amino, acetylamino, carboethoxy or carbonamido,
R³ represents hydrogen, methyl, ethyl or phenyl, or R² and R³ taken together with the carbon atoms to which they are attached form a benzene ring,
R⁴ represents hydrogen, methyl, chloro or methoxy,
R⁵ represents hydrogen, methyl, chloro, methoxy or ethoxy,
X represents an anion, and
m and n are integers from 1-3.

2. The azo dyestuff of claim 1 of the formula

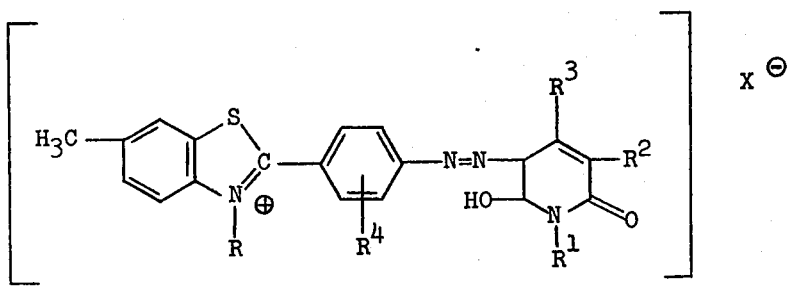

wherein
R, R¹, R⁴ and X are as defined in claim 5,
R² is hydrogen, cyano and methyl and
R³ is hydrogen, methyl, ethyl or phenyl.

3. The azo dyestuff of claim 1 wherein X is chloride, bromide, iodide, tetrachlorozincate, bisulphate, nitrate, sulphate, sulphamate, phosphate, borate, acetate, propionate, methylsulphate and p-tolylsulphonate.

* * * * *